United States Patent [19]

Nishitani

[11] 4,215,417
[45] Jul. 29, 1980

[54] TWO-TERM VECTOR MULTIPLIER

[75] Inventor: Takao Nishitani, Tokyo, Japan

[73] Assignee: Nippon Electric Company, Ltd., Tokyo, Japan

[21] Appl. No.: 6,707

[22] Filed: Jan. 26, 1979

[30] Foreign Application Priority Data

Jan. 27, 1978 [JP] Japan .................................. 53-8546

[51] Int. Cl.² ............................................. G06F 7/38
[52] U.S. Cl. ................................................ 364/736
[58] Field of Search ............... 364/736, 754, 728, 726, 364/724

[56] References Cited

U.S. PATENT DOCUMENTS

| | | | |
|---|---|---|---|
| 4,020,334 | 4/1977 | Powell et al. | 364/726 |
| 4,150,434 | 4/1979 | Shibayama et al. | 364/728 |
| 4,156,922 | 5/1979 | majerski et al. | 364/736 X |

Primary Examiner—David H. Malzahn
Attorney, Agent, or Firm—Sughrue, Rothwell, Mion, Zinn and Macpeak

[57] ABSTRACT

A two-term vector multiplier for calculating Ax+BY and useful in FFT and digital filter circuits is disclosed. The variables A and B are converted into standard type-minimal representation codes which are then operated upon to generate selection signals and an addition-subtraction control signal. The selection signals select one of four values, X, Y, Y/2 and O, to be sent to an accumulator where the selected value is either added to or subtracted from one half the value presently in the accumulator to provide a new accumulator value. The final accumulation value is Z=AX+BY.

1 Claim, 5 Drawing Figures

TWO-TERM VECTOR MULTIPLIER

BACKGROUND OF THE INVENTION

This invention relates to a two-term vector multiplier for the efficient calculation of AX+BY.

A two-term vector multiplication (referred to as two-term multiplication hereunder) is a basic operation for the realization of spectrum analyzers using FFT (Fast Fourier Transform) for digital signal processing as well as for the realization of communication systems using digital filters.

For, instance, the FFT involves complex operations including complex multiplications shown below, and the real part and the imaginary part of such complex multiplication are calculated by the two-term multiplication:

$$\begin{aligned} S \cdot T &= (S_R + S_I) \cdot (T_R + jT_I) \\ &= (S_R T_R - S_I T_I) + j(S_R T_I + S_R T_I) \end{aligned} \quad (1)$$

where $S_R$, $S_I$ and $T_r$, $T_I$ represent the real and imaginary parts of S and T, respectively.

In the digital filter, the following operation including the two-term multiplication is always accomplished. Stated in detail, in view of the stability of coefficients for giving the characteristics to the digital filter, such filter is generally composed of a combination of second-order filters whose operations are represented by the following pair of equations:

$$\begin{aligned} w_{i+1} &= x_1 - \alpha w_i - \beta w_{i-1} \\ &= x_i - (\alpha w_i + \beta w_{i-1}) \\ Y_i &= w_{i+1} + \gamma w_i + \delta w_{i-1} \\ &= w_{i+1} + (\gamma w_i + \delta w_{i-1}) \end{aligned} \quad (2)$$

where $X_i$ is the input data, $y_i$, the output data; and $w_i$, the internal state of a second-order filter all at the sampling time i; and $\alpha$, $\beta$, $\gamma$ and $\delta$ are coefficients of the second-order filter. The parenthesized parts in Equation (2) are two-term multiplications.

The two-term multiplications are thus basic operations in the field of the digital signal processing, and their efficient calculation greatly contributes to improving the performance of digital signal processors.

For details of an FFT and Digital filters, reference is made to "Theory and Application of digital Signal Processing", by Lawrence R. Robiner et al, published by PRENTICE-HALL, Inc., 1975, pp. 356–437 and pp. 75–295, respectively.

To perform two-term multiplications using an FFT and/or digital filters on a real time basis, an arithmetic circuit with smaller power consumption and a high processing capability is needed. For this approach, a basic serial-parallel type-multiplier (referred to as basic multiplier) has been proposed in "Digital Computer Design Fundamentals", by Yaohan Chu published by McGraw-Hill Book Company, Inc., 1962, pp. 24–35. The operation principle of the basic multiplier is summarized as follows: Variables X and A are computed to give a product Z in the following manner:

$$\begin{aligned} Z &= X \cdot A \\ &= X \cdot \sum_{i=0}^{n-1} a_i 2^i \\ &= \sum_{i=0}^{n-1} (a_i X) 2^i \end{aligned} \quad (3)$$

-continued where A equals $\sum_{i=0}^{n-1} a_i 2^i$, $a_i \epsilon \{0, 1\}$, with symbol "$a$" indicating that $a_i$ is an element of set $\{0,1\}$. Equation (3) can also be solved by computing the following recursive formula, where n is the total bit number of variable A and suffix i represents the i-th recursive operation and the i-th bit position of variable A:

$$\begin{aligned} R_{-1} &= 0 \\ R_i &= R_{i-1} \cdot 2^{-1} + a_i X \\ &= R_{i-1} \cdot 2^{-1} + \begin{cases} X \text{ (if } a_i = 1) \\ 0 \text{ (if } a_i = 0) \end{cases} \\ Z &= R_{n-1} \cdot 2^{n-1} \end{aligned} \quad (4)$$

A more improved example of the basic serial-parallel multiplier is the pipeline multiplier described in U.S. Pat. No. 3,885,141. This multiplier is intended to reduce the computing time per multiplication basic on the fact that the part corresponding to the number of bits of the multiplier on the LSB (least significant bit) side in the multiplication result is not used. As a result, the multiplication speed is doubled as compared with the basic multiplier by starting the next multiplication, upon completion of the LSB side operation of a first multiplication, while the MSB (most significant bit) side operation of the first multiplication is not finished. This multiplier, however, requires not only a complicated control but also a complicated structure in which six flip-flops are needed per adder for processing of each bit as is evident from FIG. 5.

Another upgraded serial-parallel multiplier is illustrated in FIG. 7 of U.S. Pat. No. 3,777,130. This multiplier uses an ROM (read only memory) and a circuit having approximately the same function as the basic multiplier to compute $A_1x_1 + A_2x_2 \ldots A_Mx_M$ in time equal to what the basic multiplier will take to accomplish a multiplication. This is due to the fact that the sum resulting from different combinations of coefficients $A_1, A_2, \ldots, A_M$ are calculated and stored in the ROM in advance. Accordingly, this multiplier using the ROM is useful only when the coefficients $A_1, A_2, \ldots, A_M$ are fixed, but not applicable to realize digital filters of different characteristics by the multiplex use of this multiplier on a time-sharing basis.

SUMMARY OF THE INVENTION

An object of the present invention is therefore to provide a serial-parallel type-two-term vector multiplier free of the above-mentioned disadvantages and simplified to achieve the high speed multiplication of AX+BY.

The present multiplier for calculating AX+BY, comprises first and second minimal-representation generating circuits for separately converting first and second variables A and B, respectively, into standard type-minimal representation codes; a control circuit responsive to the minimal representation codes of said first and second variables for generating a selection signal and an addition-subtraction control signal; a selection circuit responsive to third and fourth variables X and Y, and said selection signal generated by said selection circuit for selecting one out of said third variable, said fourth variable, $\frac{1}{2}$ of the value of said fourth variable and zero; and an acumulator connected to said selection circuit for executing in response to said addition-subtraction control signal given from said control circuit, addition and subtraction between ½ of the accumulated value and the output of said selection circuit to produce a new accumulated value.

The present invention enables the manufacture of a multiplier with the hardware scale similar to the conventional basic multiplier, with the processing capability comparable to the above-mentioned pipeline multiplier, and with the great flexibility compared with said ROM-use multiplier.

DETAILED DESCRIPTION OF THE PREFERRED EMBODIMENTS

Figure 1:
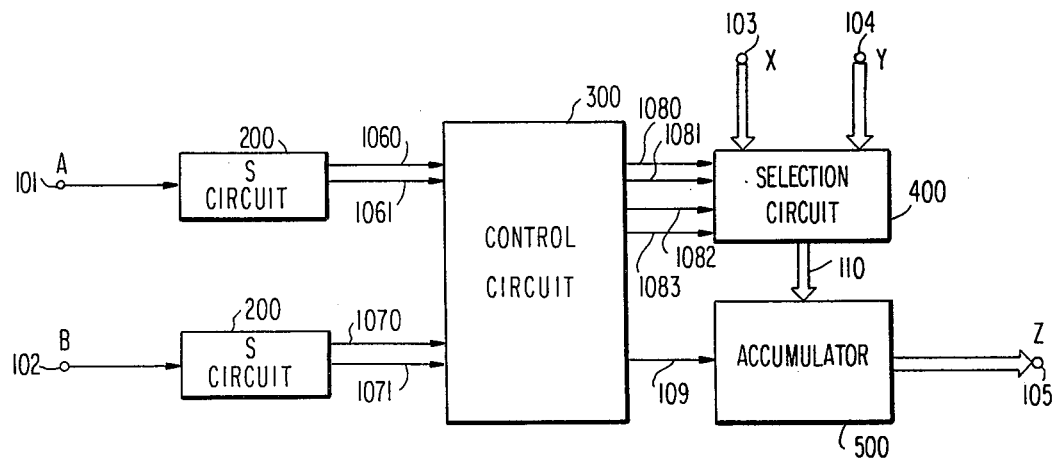
FIG. 1 is a block diagram of one embodiment of this invention.

A theoretical feature of this invention lies in that time-serial and time-parallel (referred to as serial and parallel, respectively hereunder) input variables are represented by A, B and X and Y, and tuples $(f_i)$, $(k_i)$ and $(c_i)$ for developing the two-term multiplication are obtained as follows;

$$Z = AX + BY \quad (5)$$
$$= \sum_{i=0}^{n+1} \left\{ f_i X + \bar{f}_i (1 - \frac{k_i}{2}) Y \right\} c_i 2^i$$

where n is the total bit number of each of variables A and B, i indicates the bit position, and bar "—" marked on symbols denotes their negation. Moreover, tuples $(f_i)$, $(k_i)$ and $(c_i)$ have the following relationship:

$$\bigvee_i, f_i, k_i \in \{0, 1\}$$
$$\bigvee_i c_i \in \{0, \pm 1\} \quad (6)$$

where $\bigvee_i$ represents that i can have any value with the range of $0 \leq i \leq n+1$.

Though the method for determining the tuples $(f_i)$, $(k_i)$ and $(c_i)$ will be explained later, the principle of this invention, is stated next, assuming that the development of Equation (5) has been achieved. Equation (5) can be computed by the following set of recursive formulas:

$$R_{-1} = 0 \quad (7)$$
$$R_i = R_{i-1} \cdot 2^{-1} + \left\{ f_i X + f_i (1 - \frac{k_i}{2}) Y \right\} c_i$$
$$Z = R_{n+1} \times 2^n$$

R, can be further developed as follows according to the combinations of elements $f_i$, $k_i$ and $c_i$ or tuples $(f_i)$, $(k_i)$ and $(c_i)$:

$$R_i = R_{i-1} \cdot 2^{-1} \cdot \begin{cases} +X \text{ (if } f_i = 1, c_i = 1) \\ -X \text{ (if } f_i = 1, c_i = -1) \\ +Y \text{ (if } f_i = 0, c_i = 1, k_i = 0) \\ -Y \text{ (if } f_i = 0, c_i = -1, k_i = 0) \\ +\frac{Y}{2} \text{ (if } f_i = 0, c_i = 1, k_i = 1) \\ -\frac{Y}{2} \text{ (if } f_i = 0, c_i = -1, k_i = 1) \\ +0 \text{ (if } c_i = 0) \end{cases} \quad (8)$$

The comparisons of Equations (8) and (4) clearly shows that the number of calculations needed for obtaining the value Z is almost the same, and that the only difference in that Equation (8) has a greater choice for the second term than Equation (4).

Next, the procedure for determining tuples $F=(f_i)$, $K=(K_i)$ and $C=(c_i)$ will be described. In this procedure (1) variables A and B are converted into standard type-minimal representation codes $(a'_i)$ and $(b'_i)$, respectively.

Such standard type-minimal representation (abbreviated to s—representation) is discussed in detail in the article entitled "Arithmetic Norms and Bounds of the Arithmetic An Codes" by Albert C. L. CHIANG published in "IEEE Transactions on Information Theory", Vol. IT-16, No. 4, July 1970, pp. 470–476.

A brief explanation of the minimal representation (m-representation) will be made next. An m-representation is a sort of numerical expression in radix 2 system, each of whose digits is permitted to have one of three values, 0, +1 and −1, and which has the smallest possible number of non-zero digits. By this method, a given value can be represented by a number of different m-representation codes. For instance, decimal number 11 has an m-representation code $(10\bar{1}\bar{1})$ because it can be represented as $1 \times 2^3 + 0 \times 2^2 + \bar{1} \times 2^1 + \bar{1} \times 2^0$, and another code $(1101)$ because it can also be represented as $1 \times 2^3 + 1 \times 2^2 + 0 \times 2^1 + (-1) \times 2^0$, where $\bar{1}$ denotes −1. in either expression, the number of non-zero digits is three, which is the smallest among all the m-representation codes of decimal number 11. In this case, such m-representation codes may have the longer digit length by one digit than that of the ordinary binary expression code of the same value.

Among the number of possible m-representation codes of a given value, there is always one in which the product of every adjoining pair of digits is 0. For any value, there is only one m-representation code, which is called the s-representation code of a given value. To take decimal number 11, its s-representation code is $(10\bar{1}01)$ because 11 can be represented as $1 \times 2^4 + 0 \times 2^3 + (-1) \times 2^2 + 0 \times 2^1 + (-1) \times 2^0$ and because the product of every adjoining pair of digits in $(10\bar{1}01)$ is 0.

In this case, because of the nature of the s-representation $(a'_i)$ and $(b'_i)$ consist of $n+1$ tuples each, and the following equation is made.

$$\bigvee_i, a'_{i+1} \cdot a'_i = 0 \quad (9)$$
$$\bigvee_i, b'_{i+1} \cdot b'_i = 0$$

(2) A set of digits which makes neither $(a'_i)$ nor $(b'_i)$ zero is formed; i.e., the following equation is established:

$$H = \{i \mid |a'_i| = |b'_i| = 1\} \quad (10)$$

(3) Tuple $P$ is formed on the basis of the following equation;

$$P = (p_i | p_i = b'_i \cdot S_H(i)b'_i) \quad (11)$$

where $S_H(i)$ is a characteristic function.

$$S_H(i) = 1 \quad \epsilon \ H \quad (12)$$
$$= 0 \quad \notin H$$

where symbol $\notin$ denotes not being an element of $H$.

In other words, tuple $P$ is obtained from the replacement of elements in $(b'_i)$ having suffix i $\epsilon H$ by 0.

(4) Tuple $O$ is formed depending on the following equation:

$$Q = (q_i | q_i = p_i + S_H(i-1)(b'_{i-1})) \quad (13)$$

Thus, $Q$ results from the replacement of elements in $(b'_{i+1})$ having suffix i $\epsilon \ H$ by $(b'_i)$.

(5) Tuples $C$, $F$, and $K$ are determined depending on the following equation:

$$\begin{aligned} C &= (c_i | c_i = q_i + b'_i) \\ F &= (f_i | f_i = |a'_i|) \\ K &= (k_i | k_i = S_H(i-1)) \end{aligned} \quad (14)$$

It will be demonstrated hereunder that tuples $C$, $F$, and $K$ can be determined and the two-term vector product of Equation (5) can be computed by the procedure described above.

Two-term vector product Z can be represented by the following equation using s-representation codes $(a'_i)$ and $(b'_i)$, where s-representation codes $(a'_1)$ and $(b'_i)$ have the longer digit length by one digit than that of the ordinary binary expression codes $(a_i)$ and $(b_i)$ of variables A and B, respectively:

$$\begin{aligned} Z &= AX + BY \\ &= \sum_{i=0}^{n-1} (a_iX + b_iY)2^i \\ &= \sum_{i=0}^{n} (a'_iX + b'_iY)2^i \end{aligned} \quad (15)$$

If both element $a'_i$ $(a'_i)$ and element $b'_i$ of $(b'_i)$ for a given suffix i do not take non-zero at a time, that is, $$H = \phi \ (\phi \ \text{denotes null set}) \quad (16)$$

either X or Y but not both in Equation (15) will undergo addition so that this equation like Equation (5) can be computed with a single accumulator. However, since the condition of Equation (16) is not always established, $(b'_i)$ is replaced with tuple $P$ of Equation (11). Consequently, variable B is made smaller by the amount indicated by the following equation:

$$\sum_{i=0}^{n} b'_i 2^i - \sum_{i=0}^{n} p_i 2^i = \sum_{j \in H} b'_j 2^j \quad (17)$$

To compensate for this decrement, tuple $O$ of Equation (13) is used, and the following equation is derived from Equation (13):

$$\begin{aligned} q_i &= p_i + S_H(i-1)b'_{i-1} \\ &= \begin{cases} p_i & (i-1 \notin H) \\ p_i + b'_{i-1} & (i-1 \epsilon H) \end{cases} \end{aligned} \quad (18)$$

$$= \begin{cases} p_i & (i-1 \notin H) \\ b'_{i-1} & (i-1 \epsilon H) \end{cases}$$

by using relationship of Equation (9) which leads to:

$$p_i = 0 (i-1 \epsilon H) \quad (19)$$

It has to be noted that tuple $Q$ has the longer digit length by one digit than that of tuple $P$ because the former has a term of $S_H(i-1) \times b'_{i-1}$ absent in the latter.

Further, since the following expression is obtained:

$$b'_{i-1} 2^{i-1} = b'_{i-1} 2^i - b'_{i-1} 2^{i-1} \quad (20)$$

where value B can be expressed in terms of tuples $Q$ and $K$ by using Equations (18) and (20) as follows:

$$\begin{aligned} B &= \sum_{i=0}^{n} b'_i 2^i \\ &= \sum_{i=0}^{n+1} q_i 2^i - \sum_{i=0}^{n+1} k_i q_i 2^{i-1} \\ &= \sum_{i=0}^{n+1} (1 - \frac{k_i}{2}) q_i 2^i \end{aligned} \quad (21)$$

To substitute Equation (21) for B in Equation (15), the following equation is obtained:

$$Z = \sum_{i=0}^{n+1} (a'_i X + (1 - \frac{k_i}{2}) q_i Y) 2^i \quad (22)$$

where $a'_{n+1}$ is supposed to be equal to 0.

Also, as can be readily understood from the construction of tuple $Q$ and from Equation (9), since both elements $a'_i$ and $q_i$ can never be non-zero for any given suffix i at a time, Equation (22) is paraphrased as follows by using tuple $F$ of Equation (14);

$$Z = \sum_{i=0}^{n+1} (fa'_i X + (1 - \frac{k_i}{2}) f_i q_i Y) 2^i \quad (23)$$

On the other hand, since the relations $a'_i \epsilon \{0, \pm 1\}$ and $q_i \epsilon \{0, \pm 1\}$ are maintained, elements $a'_i$ and $q_i$ take 0, +1 or -1 so that the operations in Equation (23) including addition and subtraction may be performed. Therefore, Equation (23) can be transformed to derive Equation (5) by using tuple $C$ into:

$$Z = \sum_{i=0}^{n+1} \left\{ f_i X + (1 - \frac{k_i}{2}) f_i Y \right\} c_i 2^i \quad (24)$$

In the following description, English letters and symbols such as A, B, X, Y, $(f_i)$, $(c_i)$ and $(k_1)$, etc., correspond to those of the above-mentioned description.

As illustrated in FIG. 1, one embodiment of this invention includes input terminals 101, 102, 103 and 104, a two-term vector product output terminal 105, intermediate terminals 106, 108, 109 and 110, s-representation generating circuits 200, a control circuit 300, a selection circuit 400 and an accumulator 500. Details of the circuits 200, 300, 400 and 500 are respectively described later referring to FIGS. 2, 3, 4 and 5.

In FIG. 1, thick arrows marked on paths 103, 104, 110 and 105 represent the parallel supply of input variables X and Y, any one of (X, Y, Y/2 and 0) selected by the selection circuit 400 and output Z, and thin arrows on paths 101, 102, 1060, 1061, 1070, 1071, 1080 through 1083 and 109 represent the serial supply of input variables A and B, the absolute value code and the polarity code of the s-representation code of variable A, the absolute value code and the polarity code of the s-representation code of variable B, four control signals to the circuit 400 and a control signal to the circuit 500. Variables A and B are respectively fed to the terminals 101 and 102, and converted sequentially from the LSB side into their respective s-representation codes ($a'_i$) and ($b'_i$). The absolute value code and the polarity code of ($a'_i$) are then fed through the paths 1060 and 1061 to the control circuit 300, respectively. Similarly, the absolute value code and the polarity code of ($b'_i$) are given through the paths 1070 and 1071 to the control circuit 300, respectively. The circuit 300 produce control variables ($f_i$), ($c_i$) and ($k_i$) in Equation (14) based on said s-representation codes ($a'_i$) and ($b'_i$), sequentially from the LSB side, and generates control signals for the selection of the second term of Equation (8), i.e., the selection of one out of X, Y, Y/2 and 0 depending on appropriate combinations of elements $f_i$, $c_i$ and $k_i$. The control signals given from the circuit 300 are sequentially conveyed to the circuit 400 through the paths 1080, 1081, 1082 and 1083, and at the same time, the circuit 300 produces addition-subtraction control signals to the accumulator 500 through the terminal 109 immediately when element $c_i$ becomes 1. Said variable X and Y are given from the terminals 103 and 104, respectively, to the circuit 400 so that one out of X, Y, Y/2 and 0 may be produced to the input terminal of the accumulator 500 in response to the control signals 1801 to 1803 from the control circuit 300. An accumulator register 504 (see FIG. 5) of the accumulator 500 temporarily stores $p_i$ of Equation (7), and performs Equation (8) sequentially according to the one selected by the circuit 400 out of X, Y, Y/2 and 0 and to the addition-subtraction control signal given from the control circuit 300 through the path 109. As a result, at the (n+2)-th time point, the result Z of the two-term vector product computation represented by Equation (7) is given to the terminal 105.

For example, the calculation of 11×21+5×38 is considered below. To the terminals 103 and 104 are respectively fed decimal number 21 as variable X and decimal number 38 as variable Y in parallel six-bit codes, and to the terminals 101 and 102 are supplied four-bit codes representing decimal numbers 11 and 5 as variables A and B from the LSB side on a time serial basis. In other words, (1011) is supplied to the terminal 101, and (0101) to the terminal 102 on a time serial basis. These serial data are converted by the circuit 200 into s-representation codes. As a result, to the intermediate terminals 1060 and 1061 are respectively supplied the absolute value code sequence (10101) and the polarity code sequence (00101) of the s-representation code (10101) of decimal value 11, and to the terminals 1070 and 1071 are respectively fed the absolute value code sequence (00101) and the polarity code sequence (00000) of the s-representation code (00101) of decimal value 5. Now, 0 and 1 are supposed to be positive and negative polarity codes, respectively. The control circuit 300 generates tuples C, F and K based on these two s-representation codes depending on Equations (14). In this instance, the tuples are represented as follows:

$C = (01 \bar{1} 1 \bar{1} \bar{1})$ $F = (010101)$ $K = (001010)$

Consequently, the following selection sequence can be made in appropriate combinations of tuples C, F and K at the terminals 1080 to 1083 by activating the corresponding terminals in the selection order of:

(X, Y/2, X, Y/2, X, and 0).

Meanwhile, successively control signals indicative of subtraction, addition, subtraction, addition, addition and subtraction appear at the terminal 109 depending on tuple C.

The selection circuit 400 gives binary numbers corresponding to decimal numbers 21, 38/2, 21, 38/2, 21 and 0 to the terminal 110 in response to the signals supplied from the terminals 1080 through 1083.

The accumulator 500 accomplishes the accumulation in response to the control signals appearing at the terminal 109 and the outputs at the circuit 400, resulting in supplying to the out-terminal 105 the following correct solution:

$$\begin{aligned}Z &= \{ 0 + 21 \times 2^{-1} + (38/2) \times 2^{-2} - 21 \times 2^{-3} + \\ &\quad (38/2) \times 2^{-4} - 21 \times 2^{-5} \} \times 2^5 \\ &= 21 \times 2^4 - 21 \times 2^2 - 21 + 38 \times 2^2 + 38 \\ &= 21 \times \{ 2^4 - 2^2 - 2^0 \} + 38 \times \{ 2^2 + 2^0 \} \\ &= 21 \times 11 + 38 \times 5\end{aligned}$$

Figure 2:
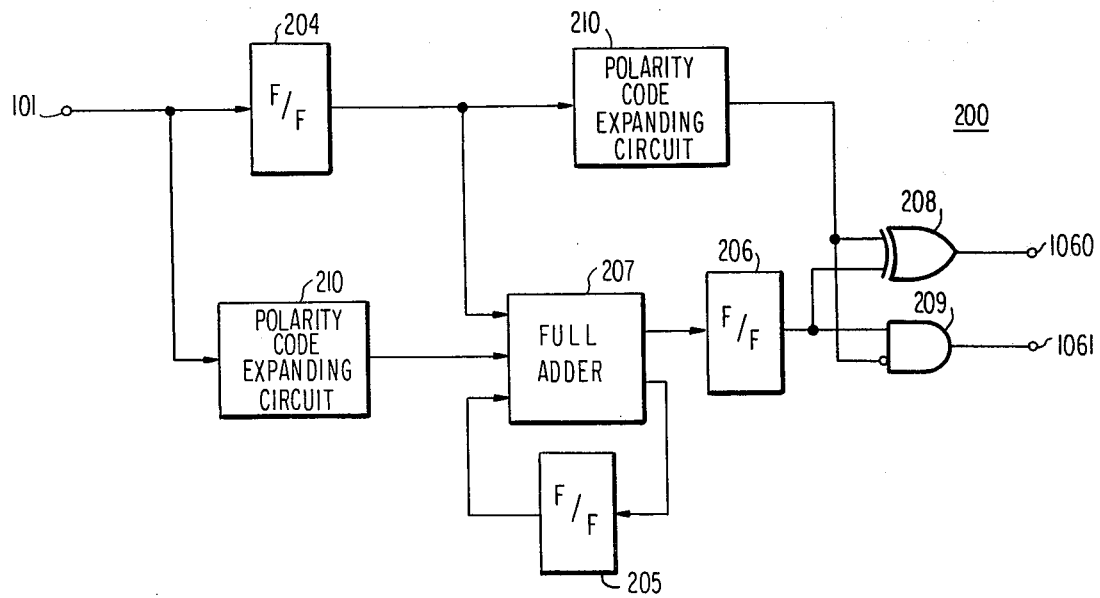
FIG. 2 illustrates the detail a part of the embodiment.

Referring to FIG. 2, the circuit 200 comprises input terminal 101, an s-representation-absolute value output terminal 1060, an s-representation-sign bit output terminal 1061, flip-flops 204, 205, 206, a full adder 207 an Exclusive-OR gate 208, an AND gate 209, and a polarity-code expanding circuit 210. The conversion of a binary number into its s-representation code is performed as follows: Namely, if a given binary number is represented by W, the arithmetic sum W and 2W is subtracted by W on a bit-by-bit basis, and the result is multiplied by ½. The bit-by-bit subtraction gives the s-representation code of three values (0, $\bar{1}$ 1). For details of the above-mentioned conversion technique, reference is made to "Error Correcting Codes, Second Edition, pp. 450–453" by Peterson & Weldon, published in 1972 by the MIT Press.

For example, how to obtain the s-representation of the earlier cited decimal value 11 will be described below. Decimal number 11 can be represented as (1011) by binary notion. This value and its two fold multiple are arithmetically added:

```
   0 1 0 1 1 . . . . . 11
(+) 1 0 1 1 0 . . . . . 22
   1 0 0 0 0 1
```

Subtraction of decimal number 11 from the final result (100001) on a bit-by-bit basis, followed by the elimination of the LSB or, in other words, the multiplication of the result by ½, gives said s-representation:

```
    1 0 0 0 0 1
(−) 0 0 1 0 1 1 . . . . . 11
    1 0 1̄ 0 1̄ 0
    1 0 1̄ 0 1̄ . . . . s-representation code of 11
```

It is supposed that, in FIG. 2, each of five bits of variable A is given sequentially from its LSB into the terminal 101. Since the flip-flop 204 delays variable A by one bit, its output is 2A. The full adder 207 adds the output 2A of the flip-flop 204 and variable A whose polarity code is expanded by one bit through the polarity-code expanding circuit 210. In this addition, the flip-flop 205 is used to maintain carry. The resultant output of the full adder 207 is 3A. The flip-flop 206 for delaying the output 3A by one bit produces an output A. To enable the 3A and A to undergo the arithmetic operation, the output of the flip-flop 204 is given the same bit length as that of 3A produced on the flip-flop 206 through the circuit 210, and the bit-by-bit subtractions are accomplished by the gates 208 and 209 with the result that the s-representation code is obtained from the output terminal 1060 and the terminal 1061. The circuit 210 is a flip-flop to expand the MSB of a given data by one bit. The carry-maintaining flip-flop 205 has to be reset in advance of the adding operation.

Figure 3:
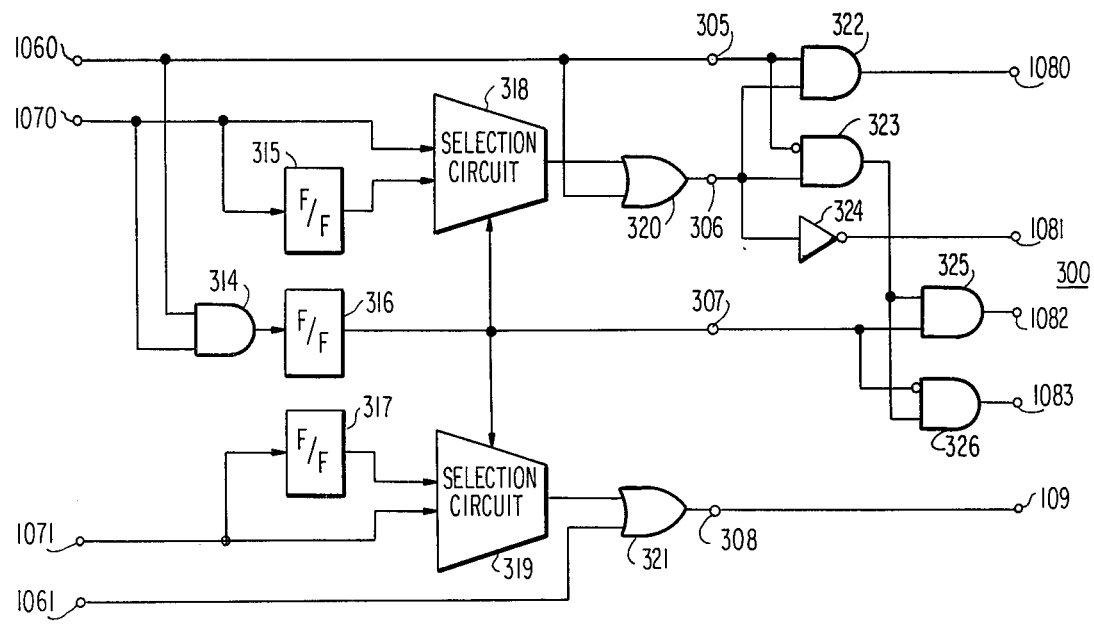
FIG. 3 illustrates in detail another part of the embodiment.

Referring to FIG. 3, the control circuit 300 has absolute-value code input terminals 1060 and 1070, polarity code input terminals 1061 and 1071, intermediate terminals 305, 306, 307 and 308, selection-signal output terminals 1080, 1081, 1082 and 1083, an addition-subtraction control signal 109, AND gates 314, 322, 323, 325 and 326, OR gates 320 and 321, and inverter gate 324, flip-flops 315, 316 and 317, and 2-1 selection circuits 318 and 319. A first s-representation code ($a'_i$) is given from the terminals 1060 and 1061, and a second s-representation code ($b'_i$) is similarly fed from the terminals 1070 and 1071. Supposing that the absolute value codes of said s-representation codes ($a'_i$) and ($b'_i$) are sequentially given to the terminals 1060 and 1070, respectively, the AND gate 314 detects bit positions where both are non-zero. Since the flip-flop 316 delays the output of the gate 314 by one bit, the terminal 307 is fed with tuple ($k_i$) represented by tuple $k$ of recursive Equation (14). The absolute value code of said code ($a'_1$) is tuple ($f_i$) of Equation (14), and ($f_i$) is sequentially supplied to the terminal 305. Said code ($b'_i$) supplied from the terminals 1070 and 1071 undergoes the control by the 2-1 selection circuits 318 and 319 in response to the output of the flip-flop 316, i.e., a signal corresponding to tuple ($k_i$) of Equation (14), and is supplied as output either as it is or delayed by one bit by the flip-flops 315 and 317. This means that ($q_i$) of Equation (18) has been produced. Consequently, the absolute value code of ($q_i$) of said Equation (18) is generated as output of the 2-1 selection circuit 318, and also the polarity code of Equation (18) is supplied as output of the 2-1 selection circuit 319. Since the OR gates 320 and 321 function to add the absolute value code and the polarity code of the s-representation code ($a'_i$) respectively given to the terminals 1060 and 1061 to those corresponding to ($q_i$) of Equation (18) supplied from the circuits 318 and 319, the absolute value code and the polarity code of tuple ($c_i$) of Equation (14) are obtained at the terminals 306 and 308, respectively. The output of the OR gate 321 appearing at the terminal 308 is conveyed directly as the addition-subtraction control signal to the output terminal 109 to control the accumulator 500 of FIG. 1. The AND gate 322 provides the conditions corresponding to the first and second lines of Equation (8) based on the absolute value codes corresponding to ($f_i$) and ($c_i$) of Equation (14) respectively emerging at the terminals 305 and 306, and transmits to the terminal 1080 a signal which requests the selection circuit 400 of FIG. 1 to select variable X given to the terminal 103. The AND gates 323 and 325 make the conditions corresponding to the third and fourth lines of Equation (8) given from the signals appearing at the terminals 305, 306 and 307, respectively, corresponding to the absolute value codes of ($f_i$) and ($c_i$) and ($k_i$) of Equation (14). Consequently, a signal which requests the selection circuit 400 to select said variable Y given to the terminal 104 is supplied to the terminal 1082 through the AND gate 325. The AND gates 323 and 326 give the conditions corresponding to the fifth and sixth lines of Equation (8) from the signals produced at the terminals 305, 306 and 307 respectively corresponding to the absolute value codes of tuples ($f_i$) and ($c_i$) and to ($k_i$) of Equations (14). As a result, a signal which requests the circuit 400 to select $\frac{1}{2}$ of said variable Y, i.e., Y/2 is given to the terminal 1083 through the gate 326. The gate 324 gives the condition corresponding to the seventh line of Equation (8) by inversing the absolute value code of ($c_i$) of Equation (14) given at the terminal 306, and transmits to the terminal 1081 a signal which requests the circuit 400 to select 0.

Figure 4:
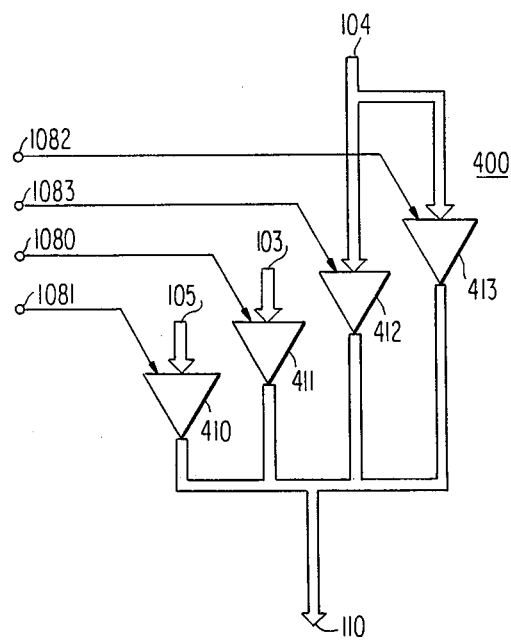
FIG. 4 illustrates in detail still another part of the embodiment.

Referring to FIG. 4, the selection circuit 400 is composed of input terminals 1080 through 1083, a zero input terminal 105, a third parallel variable (X) input terminal 103, a fourth parallel variable (Y) input terminal 104 selection gates 410, 411, 412 and 413, and an output terminal 110. Since the variable (Y) input terminal 104 is connected to the gate 413 in the form shifted down by one bit, the output of the gate 413 is Y/2. The selection signal generated from the control circuit 300 is applied to the terminals 1082, 1083, 1080 and 1081 and activates any one of the gates 410, 411, 412 and 413. The activated gate conveys one of four values 0, X, Y and Y/2 to the terminal 110.

Figure 5:
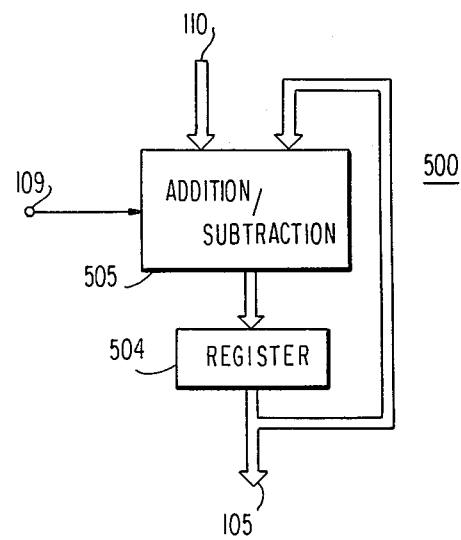
FIG. 5 illustrates in detail yet another part of the embodiment.

Referring to FIG. 5, the accumulator 500 consists of a control-signal input terminal 109, an accumulation input terminal 110, an accumulator output terminal 105, an accumulator register 504 and an addition-subtraction circuit 505. Herein, the output of the accumulator 504 is connected to the input of the circuit 505 in the shift-down form so that said output may be multiplied by $\frac{1}{2}$. The accumulator 504 temporarily stores the partial product $p_i$ of Equation (7). Thus, Equation (7) is executed to give the output of the circuit 505 in response to a signal given from the circuit 300 through the terminal 109 and the data (X, Y, 0 or Y/2) selected by the circuit 400, and as a result, new partial product $p_i$ is transferred to the register 504. By repeating this procedure n+2 times, Z in Equation (7) is obtained to give the two-term vector product of Equation (5).

In this way, this invention achieves the two-term vector multiplication with the simple circuits.

What is claimed is:

1. A two-term vector multiplier for calculating AX+BY, comprising: first and second minimal-representation generating circuit means for separately converting first and second variables A and B, respectively, into standard type-minimal representation codes; a control circuit means responsive to the minimal representation codes of said first and second variables for generating a selection signal and an addition-subtraction control signal; a selection circuit means responsive to third and fourth variables X and Y and to said selection signal for selecting one of the values X, Y, Y/2, and 0; and an accumulator means connected to said selection circuit and responsive to said addition-subtraction control signal for adding or subtracting between $\frac{1}{2}$ of the accumulated value and the output of said selective circuit to produce a new accumulated value.

* * * * *

UNITED STATES PATENT AND TRADEMARK OFFICE
CERTIFICATE OF CORRECTION

PATENT NO. : 4,215,417

DATED : July 29, 1980

INVENTOR(S) : Takao Nishitani

It is certified that error appears in the above—identified patent and that said Letters Patent is hereby corrected as shown below:

IN THE ABSTRACT:

Line 1, delete "Ax + BY" insert --AX + BY--

IN THE SPECIFICATION:

Column 1, line 38 - delete "$y_i$" insert -- $Y_i$ -- line 48 - delete "digital" insert --Digital--

Column 2, line 5 - delete "$\alpha$" insert "$\varepsilon$"--

Column 3, line 18 - before "detail" delete "the" insert --in-- line 66 - delete "R," insert -- $R_i$ -- line 67 - delete "or" insert --of-- line 68 - delete "($k_i$9" insert --($k_i$)--

Column 4, line 12 - delete "comparisons" insert --comparison-- line 15 - delete "in" insert --is-- line 18 after "procedure" insert -- : -- line 19 - delete "variables" insert "Variables"

line 25 - delete "An" insert --AN--

UNITED STATES PATENT AND TRADEMARK OFFICE
CERTIFICATE OF CORRECTION

PATENT NO. : 4,215,417
DATED : July 29, 1980
INVENTOR(S) : Takao Nishitani

It is certified that error appears in the above—identified patent and that said Letters Patent is hereby corrected as shown below:

column 4, line 36 - delete "$(101\bar{1})$" insert -- (1011)

Line 38 - delete "(1011)" insert -- $(110\bar{1})$ -- line 39 - after "where" delete "1" insert -- $\bar{1}$ -- line 40 - delete "in" insert -- In -- line 52 - delete "(10101)" insert -- $(10\bar{1}0\bar{1})$ --

Column 5, line 13 - delete "E" insert -- $\varepsilon$ -- line 14 - delete "O" insert -- $\mathcal{Q}$ -- line 20 - delete "E" insert -- $\varepsilon$ -- line 46 - after "a'i " insert --of-- line 61 - delete "O" insert -- $\mathcal{Q}$ -- line 67 - delete "c" insert -- $\kappa$ --

Column 6, line 3 - delete "$\varepsilon$" insert -- $\kappa$ -- line 38 - delete ";" insert -- : -- line 56 - delete "$(k_1)$" insert -- $(k_i)$ --

UNITED STATES PATENT AND TRADEMARK OFFICE
CERTIFICATE OF CORRECTION

PATENT NO. : 4,215,417
DATED : July 29, 1980
INVENTOR(S) : Takao Nishitani

It is certified that error appears in the above—identified patent and that said Letters Patent is hereby corrected as shown below:

Column 7, line 17 - delete "produce" insert -- produces -- line 29 - delete "variable" insert -- variables -- line 58 - delete "(10101)" insert -- ($10\bar{1}0\bar{1}$) --

Column 8, line 36 - after "207" insert -- , -- line 44 - delete "(0, $^{35}$ 1)" insert -- (0, $\pm$ 1) -- line 52 - delete "notion" insert -- notation --

Column 9, line 37 - delete "k" insert -- K --

Column 10, line 22- delete "405" insert -- 105 -- line 24- after "104" insert -- , --

Signed and Sealed this

Ninth Day of December 1980

[SEAL]

Attest:

SIDNEY A. DIAMOND

Attesting Officer

Commissioner of Patents and Trademarks